(12) United States Patent
Ogiwara et al.

(10) Patent No.: US 6,716,923 B1
(45) Date of Patent: Apr. 6, 2004

(54) RESIN COMPOSITION FOR POWDER MOLDING

(75) Inventors: Manabu Ogiwara, Kanagawa (JP); Seiki Yada, Kanagawa (JP)

(73) Assignee: Zeon Kasei Co., Ltd., Tokyo (JP)

( * ) Notice: Subject to any disclaimer, the term of this patent is extended or adjusted under 35 U.S.C. 154(b) by 0 days.

(21) Appl. No.: 10/148,344

(22) PCT Filed: Oct. 26, 2000

(86) PCT No.: PCT/JP00/07515

§ 371 (c)(1),
(2), (4) Date: May 30, 2002

(87) PCT Pub. No.: WO01/32770

PCT Pub. Date: May 10, 2001

(30) Foreign Application Priority Data

Oct. 29, 1999 (JP) ............................................. 11-307934

(51) Int. Cl.[7] ............................ C08L 9/00; C08L 23/00; C08L 23/04; C08L 27/00; C08L 27/04

(52) U.S. Cl. ........................ 525/191; 525/217; 525/221; 525/222; 525/232; 525/238; 525/240; 525/241

(58) Field of Search ................................. 525/191, 217, 525/221, 222, 232, 238, 240, 241

(56) References Cited

U.S. PATENT DOCUMENTS 5,308,699 A * 5/1994 Hikasa et al. ............... 428/402
5,308,700 A * 5/1994 Hikasa et al. ............... 428/402

FOREIGN PATENT DOCUMENTS

| EP | 0575809 | 12/1993 |
|---|---|---|
| JP | 05-001183 | 1/1993 |
| JP | 05-005050 | 1/1993 |
| JP | 06-106553 | 4/1994 |
| JP | 06-170871 | 6/1994 |
| JP | 06-226763 | 8/1994 |
| JP | 07-178742 | 7/1995 |
| JP | 07-196819 | 8/1995 |
| JP | 08-217927 | 8/1996 |
| JP | 10-316795 | 12/1998 |
| JP | 11-262519 | 9/1999 |
| JP | 2000154285 | 6/2000 |

* cited by examiner

*Primary Examiner*—Nathan M. Nutter
(74) *Attorney, Agent, or Firm*—Dinsmore & Shohl LLP

(57) ABSTRACT

The invention provides an olefin resin composition for powder molding comprising 100 parts by weight of an olefin resin (A) having a glass transition temperature of 25° C. or lower such as a propylene homopolymer or hydrogenated styrene-butadiene block copolymer and 0.5 to 30 parts by weight of a non-halogen type thermoplastic resin (B) such as methyl methacrylate having a glass transition temperature of 60 to 200° C., an average particle diameter of 0.1 to 10 μm and a sphericity of 0.8 to 1.0.

The resin composition is very excellent in powder flowability and can be easily molten even under conditions where there is little or no pressure or shear stress action, and so best suited for use as powder slush molding compositions.

7 Claims, No Drawings

RESIN COMPOSITION FOR POWDER MOLDING

TECHNICAL FIELD

The present invention relates generally to an olefin resin composition for powder molding, and more particularly to a resin composition for powder molding that is improved in terms of powder flowability and moldability.

BACKGROUND ART

Skin materials for automotive interior parts such as instrument panels, console boxes, door trims and glove boxes have so far been substantially molded of vinyl chloride-based resin materials. In consideration of recent environmental problems, however, there is growing demand for parts molded of easy-to-recycle olefin resin materials classified as non-halogen type resins.

Numerous olefin resin compositions have thus been put forward as powder-molding materials (for instance, Japanese Patent Application Laid-open (A) Nos. 7-178742, 6-226763, 8-217927, 6-170871, 5-1183 and 5-5050). However, these compositions are so poor in powder flowability that particles are susceptible to agglomeration, often resulting in products having thickness variations, deficiencies, and pinholes.

To solve such poor-flowability problems with these powder-molding olefin resin composition, the deposition of inorganic dusting agents such as finely divided talc, calcium carbonate, calcium silicate and aerosol onto the surfaces of resin particles has generally been relied upon. However, the presence of the inorganic dusting agent on the surfaces of resin particles gives rise to an increase in the resin surface's melting viscosity, which in turn results in the need of carrying out molding at considerably high temperatures for considerably long periods of time. This eventually makes moldability worse.

JP-A 6-106553 comes up with a process wherein finely divided resin powders having an average particle diameter of up to 30 μm such as those based on polypropylene resins, polyethylene resins and vinyl resins are used as dusting agents for thermoplastic elastomers comprising ethylene α-olefin copolymer rubber and olefin resins. However, since these components have a glass transition temperature that is lower than room temperature, the temperature of the resin composition rises locally upon repeated powder molding cycles and so the particles are likely to agglomerate. As a consequence, the flowability of powders drops, often resulting in sheet moldings having thickness variations, and pinholes. After long-term storage, the flowability of such resin compositions becomes extremely worse, ending up with a drop of powder moldability.

DISCLOSURE OF THE INVENTION

Situations being like this, an object of the present invention is to provide an olefin resin composition that ensures improved powder flowability and long-term storability, and has moldability so improved that even upon powder sintering and molding, there is no need of elevating molding temperature and extending molding time or there is no moldability-disturbing factor.

The inventors have now found that the aforesaid object is achieved by the incorporation into an olefin resin of a non-halogen type thermoplastic resin having a specific glass transition temperature and a specific particle diameter and shape. On the basis of such findings, the present invention has now been accomplished.

More specifically, the present invention provides an olefin resin composition for powder molding, comprising (A) 100 parts by weight of an olefin resin having a glass transition temperature of up to 25° C. and (B) 0.5 to 30 parts by weight of a non-halogen type thermoplastic resin having a glass transition temperature in the range of 60 to 200° C. an average primary particle diameter in the range of 0.1 to 10 μm and a sphericity in the range of 0.8 to 1.0.

The olefin resin composition for powder molding according to the present invention is excellent in powder flowability and long-term storability, and is improved in terms of powder moldability as well.

BEST MODE FOR CARRYING OUT THE INVENTION

The present invention is now explained at great length.

The olefin resin (A) used herein includes a homopolymer or copolymer of olefin monomers having 2 to 10 carbon atoms such as ethylene, propylene and 1-butene, and a copolymer of at least 50% by weight of one or two or more such monomers and other monomers copolymerizable therewith. The olefin resin (A) should have a glass transition temperature (Tg) of up to 25° C., and preferably up to 20° C. When the Tg of component (A) is too high, high temperature is needed to mold powders. In addition, the resulting molded product has limited use, because it is hard, and cannot be released out of the mold unless its configuration is simple. It is noted that Tg may be determined by means of a differential calorimeter.

Typical examples of such an olefin resin (A) are ethylene resin and propylene resins.

The ethylene resins include high density polyethylene, medium density polyethylene, low density polyethylene and linear low density polyethylene as well as ethylene copolymers containing at least 50% by weight of ethylene such as ethylene-propylene copolymers, ethylene-propylene-diene copolymers, ethylene-1-butene copolymers, ethylene-1-hexene copolymers, ethylene-1-heptene copolymers, ethylene-1-octene copolymers (EOR), ethylene-4-methyl-1-pentene copolymers, ethylene-vinyl acetate copolymers, ethylene-acrylic acid copolymers, ethylene-acrylic acid alkyl ester copolymers, ethylene-methacrylic acid copolymers and ethylene-methacrylic acid alkyl ester copolymers. The preferred ethylene resins are linear low density polyethylene, ethylene-1-butene copolymers, ethylene-1-hexene copolymers, ethylene-1-heptene copolymers and ethylene-1-octene copolymers (EOR).

Exemplary propylene resins are propylene homopolymers and copolymers of at least 50% by weight of propylene and other α-olefins. The α-olefins used herein, for instance, are ethylene, 1-butene, 4-methyl-1-pentene and 1-octene. It is noted that the copolymers of propylene and α-olefins include random copolymers, alternating copolymers and block copolymers, and may be produced by any desired production processes.

According to the present invention, the olefin resin (A) also includes an aromatic thermoplastic elastomer exemplified by styrene-butadiene-styrene block copolymers (SBS) and styrene-isoprene-styrene block copolymers (SIS) as well as their hydrogenated products (SEBS, SEPS).

According to the present invention, the aforesaid olefin resins (A) may be used alone or in combination of two or more.

Referring to the properties of the olefin resins (A) used herein, they should have a melt flow rate of at least 5 g/10 min., and preferably at least 20 g/10 min. (MFR: as measured according to JIS K 7210 and at 230° C. under 2.16 Kg load for resins having a melting point of 160° C. or higher and at 190° C. under 2.16 Kg load for resins having a melting point of less than 160° C.). With resins having an excessively low MFR, viscosity sintering becomes difficult and the resulting molded product is likely to have defects such as pinholes.

The non-halogen type thermoplastic resin (B) used herein is a polymer in which any halogen type compound is not used as a monomer, and has a glass transition temperature (Tg) in the range of 60 to 200° C., and preferably in the range of 80 to 130° C. At an excessively low Tg, the flowability of powders tends to become worse in the process wherein molding temperature rises. At an excessively high Tg, to the contrary, the melting properties of powders may possibly degrade upon molding.

The non-halogen type thermoplastic resin (B) has an average primary particle diameter in the range of 0.1 to 10 $\mu$m, and preferably 0.5 to 5 $\mu$m. When the average primary particle diameter is excessively small, the powder flowability of the present composition tends to dwindle with time in the case where the amount of the thermoplastic resin (B) added is relatively small. Where the thermoplastic resin (B) added is large, the resulting molded product is likely to have defects such as color variations. On the other hand, when the average primary particle diameter is excessively large, the thermoplastic resin (B) has a risk of hardly functioning as a dusting agent. The average primary particle diameter may be determined by dispersing powders of the non-halogen type thermoplastic resin (B) in water, shaking the dispersion for 1 minute in an ultrasonic shaker operating at an oscillation frequency of 50 kHz, and permitting the shaker to stand for 3 minutes to find a integral particle diameter distribution by means of a centrifugal sedimentation turbidimetry method using the resulting suspension. The average primary particle diameter is then given by a particle diameter with a cumulative value of 50%.

The sphericity of the non-halogen type thermoplastic resin (B) should be in the range of 0.8 to 1.0. When the non-halogen type thermoplastic resin having too low sphericity is used as the dusting agent, any sufficient improvement in power flowability is not obtainable. Referring to how to determine the sphericity, a sample is first observed at 10,000×magnifications under a transmission electron microscope (TEM) to check whether polygonal or acute particles are found or not. If they are not found, then a photograph is taken of the sample. From the photograph the mean breadth-to-length ratio is found for 100 particles.

Vinyl resins are preferable for the non-halogen type thermoplastic resin (B). Exemplary vinyl resins are acrylic resins that are polymers of ethyl arcylate, methyl methacrylate or the like; aromatic vinyl resins that are polymers of styrene, α-methylstyrene, vinyltoluene or the like; vinyl cyanide resins that are polymers of acrylonitrile, vinylidene cyanide or the like; vinyl ester resins that are polymers of vinyl acetate, vinyl propionate or the like; and vinyl ether resins that are polymers of methyl vinyl other, hydroxybutyl vinyl ether or the like.

Merits of acrylic resins containing as monomers acrylates or methacrylates having various alkyl groups are that such monomers are available with relative ease and Tg can be easily varied depending on the length of alkyl groups. Typical acrylic resins are homopolymers of methyl methacrylate (Tg: 105° C.), ethyl methacrylate (Tg: 65° C.), isopropyl methacrylate (Tg: 81° C.), t-butyl methacrylate (Tg: 107° C.) and phenyl methacrylate (110° C.). It is here noted that the referred-to values of Tg are measured on a homopolymer basis. In the present invention, these resins may be used immediately as the dusting agent.

Monomers that give homopolymers having a Tg value of lower than 60° C., for instance, n-butyl methacrylate (21° C.), n-octyl methacrylate (−20° C.) and n-hexyl methacrylate (−5° C.) should preferably be copolymerized with other monomers that yield homopolymers having high Tg values, for instance, the aforesaid acrylic or methacrylic ester as well as styrene (105° C.) and α-methylstyrene (101 to 125° C.), so that Tg values of 60° C. or higher can be obtained.

When acrylic resins have a core-shell structure wherein the Tg of a shell-forming polymer is 60° C. or higher, it is then possible to use as a core-forming polymer a polymeric material having a Tg value of lower than 60° C. such as polyinethyl acrylate (Tg: 3° C.), polyethyl acrylate (Tg: −22° C.), poly(n-propyle acrylate)(Tg: −44° C.) and poly (n-octadecyl methacrylate)(Tg: −100C.). It is here understood that the core-to-shell composition ratio is not critical.

The non-halogen type thermoplastic resin (B) used herein may be easily prepared by emulsion polymerization processes (including a seeding emulsion polymerization process) or fine suspension polymerization processes (including a seeding fine suspension polymerization). To prepare polymer particles suitable for dusting agents and having a small average particle diameter, it has so far been ordinary to make use of a process wherein crude particles or pellets of that polymer are crushed by means of turbo mills, roller mills, ball mills, centrifugal crushers, pulverizers or the like while they are cooled with dry ice, liquid nitrogen or the like to obtain particles, the particles are classified through a classifier, and the thus classified particles are regulated by further pulverization to the desired particle diameter. However, this process is very low in terms of not only productivity but cost-effectiveness as well thanks to the use of dry ice or liquid nitrogen.

Production processes such as emulsion polymerization processes or fine suspension polymerization processes, on the other hand, enable particle diameters to be easily designed depending on the type and amount of the emulsifiers used for polymerization, stirring conditions upon polymerization, etc., so that particles having an average primary particle diameter of 0.1 to 10 $\mu$m best suited for the dusting agent of the invention can be easily obtained. In addition, these processes make it possible to prepare particles as close to true spheres as possible. Thus, these production processes are preferable for the preparation of the non-halogen type thermoplastic resin (B) used herein.

If a resin compatible with the olefin resin (A) is used as the non-halogen type thermoplastic resin (B), there is then little or no degradation in the physical properties of the molded product even when used in an increased amount. The aforesaid acrylic resin should preferably have an alkyl group component having eight or more carbon atoms, because its compatibility with the olefin resin increases gradually as the number of carbon atoms in the alkyl group exceeds eight.

In powder slush molding, a powder form of resin composition is fed to a heated mold wherein the composition is melted and deposited onto the surface of the mold. Excessive powders, if any, are fed from the mold back to a reservoir for repeated use in the next mold. In this case, the temperature of the powders fed back to the reservoir rises to about 40 to 60° C. under the influence of heat transmitted from the mold. Accordingly, the non-halogen type thermoplastic resin (B) used as the dusting agent should most preferably have a Tg value in the range of 100 to 120° C. In this context, an acrylate resin composed mainly of methyl methacrylate and a styrene resin composed mainly of styrene are preferred.

It is herein understood that, in addition to the aforesaid olefin resin (A) and non-halogen type thermoplastic resin (B), thermoplastic elastomers such as urethane-based thermoplastic elastomers and polyester-based thermoplastic elastomers; rubber components such as styrene-butadiene rubber, acrylic rubber, isoprene rubber, butyl rubber and ethylene-propylene rubber, wherein the double bonds of conjugated diene monomers may have been hydrogenated; and plasticized oils based on paraffin, naphthene, aromatics and plants may be used for the purposes of lowering the softening point of the molded product, enhancing the mechanical strength of the same, improving the feel of the same, etc., provided that they should not be detrimental to the objects of the invention. If required, antioxidants, UV absorbers, antitstatics, flame-retardants, pigments, slip agents, dispersants, fillers and other additives may be added to the resin composition. Known plasticizers and so on, too, may be added to the resin composition on condition that they should not be detrimental to moldability and physical properties.

Furthermore in the present invention, organic peroxides may be added to the resin composition for the purposes of lowering the molecular weight of the olefin resin (A) and improving the melting properties of the same.

The olefin resin composition for powder molding of the invention may be produced by uniformly mixing the aforesaid respective components. First, one or two or more olefin resin (A) components are mixed with other components added if required. Any desired mixing means may be used to this end provided that the desired uniform mixture is obtainable. Usually, uniform mixing is carried out by means of mixers such as tumbling mixers or Henschel mixers to obtain a uniform mixture. While the polymer is molten, the mixture is kneaded using a closed type mixture such as Banbury mixers or pressing kneaders or an extrusion kneader such as uniaxial or biaxial extruders, thereby obtaining a powdery mixture free from the non-halogen type thermoplastic resin (B).

For mixing, melting and kneading, it is acceptable to rely upon a process using an extruder having a multiplicity of feed ports, wherein the respective components are successively fed, molten and kneaded.

When an extruder or the like is used with a process for carrying out mixing and kneading while the resin component is molten, fine strands (filaments) of polymer melt are cut by direct use of a fast rotary cutter blade or the like into powders having a diameter of 50 to 500 µm on average. Alternatively, the polymer melt may first be formed into pellets of about 1 to 10 mm in length and about 0.3 to 3 mm in diameter, which are in turn formed into powders having a particle size of 50 to 500 µm on average. For crushers, use may be made of turbo mills, roller mills, ball mills, centrifugal crushers, pulverizers, etc.

Then, the aforesaid powdery mixture is mixed with the non-halogen type thermoplastic resin (B) component. For this mixing, use may be made of mixers unaccompanied by polymer melting such as tumbling mixers, universal mixers, hopper mixers and Henschel mixers.

The thus obtained powdery olefin resin composition should have an average particle diameter in the range of preferably 50 to 500 µm, and more preferably 100 to 300 µm. The "average particle diameter" of the olefin resin composition is here understood to refer to a particle diameter corresponding to an aperture or opening at which a cumulative particle diameter distribution obtained by sieve analysis using a JIS standard sieve indicates 50%. Resin powders of less than 50 µm as represented by this average particle diameter are poor in efficiency of comminution, and are susceptible to agglomeration as well upon prepared and stored. On the other hand, powders of greater than 500 µm tend to yield molded products of coarse texture or give rise to pinholes in molded products when they are thin.

EXAMPLES

The present invention is now explained with reference to inventive and comparative examples; however, it is understood that the invention is not limited thereto.

A resin corresponding to the non-halogen type thermoplastic resin (B) component was prepared as follows.

(1) Preparation Example 1

Two hundred (200) parts by weight of water with 0.5 part by weight of polyvinyl alcohol and 0.5 part by weight of methyl cellulose dissolved therein were placed in a stainless reactor having a stirrer and a jacket, which was deaerated. Then, 0.2 part by weight of azobisisobutyro-nitrile and 100 parts by weight of methyl methacrylate were charged in the reactor, which was then heated and held at a temperature of 55° C. for polymerization reaction. The degree of polymerization was tracked through the concentration of solid matter in a small amount of sampled reaction solution until the degree of polymerization of 90% was detected. Then, the reaction solution was cooled for the termination of the reaction, thereby obtaining a slurry. After dehydration, the slurry was dried in a dryer through which nitrogen of 170° C. was flowed, thereby obtaining a non-halogen type thermoplastic resin 1. The properties are shown in Table 1.

(2) Preparation Example 2

A non-halogen type thermoplastic resin 2 was obtained as in Preparation Example 1 with the exception that the monomer was changed from 100 parts by weight of methyl methacrylate to 100 parts by weight of ethyl methacrylate. The properties are shown in Table 1.

(3) Preparation Example 3

A non-halogen type thermoplastic resin 3 was obtained as in Preparation Example 1 with the exception that the monomer was changed from 100 parts by weight of methyl methacrylate to 100 parts by weight of styrene. The properties are shown in Table 1.

(4) Preparation Example 4

A non-halogen type thermoplastic resin 4 was obtained as in Preparation Example 1 with the exception that the monomer was changed from 100 parts by weight of methyl methacrylate to 50 parts by weight of methyl methacrylate and 50 parts by weight of styrene. The properties are shown in Table 1.

(5) Preparation Example 5

A non-halogen type thermoplastic resin 5 was obtained as in Preparation Example 1 with the exception that the monomer was changed from 100 parts by weight of methyl methacrylate to 100 parts by weight of n-propyl methacrylate. The properties are shown in Table 1.

TABLE 1

|  | Tg(°C.) | APD μm | SPH |
|---|---|---|---|
| Non-halogen type thermoplastic resin 1 | 105 | 1 | 1.0 |
| Non-halogen type thermoplastic resin 2 | 65 | 1 | 1.0 |
| Non-halogen type thermoplastic resin 3 | 105 | 1 | 1.0 |
| Non-halogen type thermoplastic resin 4 | 113 | 1 | 1.0 |
| Non-halogen type thermoplastic resin 5 | 35 | 1 | 1.0 |
| Polyvinyl chloride *1 | 85 | 40 | 1.0 |
| Calcium carbonate *2 | — | 1 | 1.0 |
| Methyl methacrylate homopolymer *3 | 120 | 9 | 0.7 |
| Talc *4 | — | 1.5 | 0.6 |
| Nylon *5 | 50 | 20 | 0.7 |

APD: average particle diameter
SPH: sphericity
*1: ZEST PBZXA (vinyl chloride homoplymer mad by Shin Daiichi Enbi Co., Ltd.
*2: Sunlight SL2500 made by Takehara Chemistry Industries, Co., Ltd.
*3: Acrypet VH01 made by Mitsubishi Rayon Co., Ltd.
*4: P-4 made by Nippon Talc Co., Ltd.
*5: UBE Nylon 1013B made by Ube Industries, Ltd.

Inventive Examples 1–6 & Comparative Examples 1–8

Sixty (60) parts by weight of propylene homopolymer (J709 made by Grand Polymer Co., Ltd. and having an MFR of 55 g/10 min.) and 40 parts by weight of SEBS (Toughtech H1042 made by Asahi Chemical Industry Co., Ltd. and having an MFR of 30 g/10 min.) were mixed together in a tumbling mixer (note that in Example 3 any mixing was unnecessary because of the single use of propylene homopolymer). Then, the mixture was molten and kneaded in a biaxial extruder (TEM-35B made by Toshiba Machinery Co., Ltd with a cylinder diameter of 35 mm and a barrel temperature of 200° C.) to obtain a pellet of 2 mm in diameter and 3 mm in length. Then, the pellet was pulverized in a turbo mill to obtain a powdery olefin resin (A).

In a Henschel mixer, the powdery olefin resin was mixed with the types and amounts of the non-halogen type thermoplastic resin shown in Tables 2, 3–1 and 3–2, thereby obtaining olefin resin composition for powder molding. The obtained olefin resin composition for powder molding were evaluated by the following methods in terms of powder flowability, powder flowability after long-term storage and powder moldability. The results are set out in Tables 2, 3–1 and 3–2.

(1) Powder Flowablllity

Using a bulk specific gravity metering machine according to JIS K 6721, the falling time of 100 cc of a resin composition sample at a temperature of 23° C. is measured. The shorter the falling time, the better the powder flowability. A sample having a falling time of longer than 30 seconds may possibly yield a molded sheet with thickness variations because of its poor flowability. A resin composition sample is placed and held in an oven of 50° C. for 30 minutes until it is heated to 50° C., just after which the falling time of the sample (100 cc) is measured as mentioned above.

In general powder slush molding, resin compositions for powder molding are fed to heated molds where they are molten, and excessive powders are fed back to reservoirs for repeated use. In this case, the temperature of the resin composition for powder molding fed back to the reservoir Increases slowly under the influence of heat transmitted from the mold and so the resin composition for powder molding agglomerates locally For this reason, the powder flowability drops with the result that thickness variations or pinholes occur in molded sheets. Even when a resin composition for powder molding having improved powder flowability is repeatedly molded on an actual mold, it is believed that the resin composition for powder molding extends into every section of the mold, ensuring stable molding.

(2) Long-Term Storability

The long-term storability of a resin composition for powder molding sample was evaluated by measuring the powder flowability of the sample by the method described at (1) after storage in an oven at a temperature of 30° C. for one month.

A resin composition for powder molding containing an easy-to-bleed component agglomerates under the influence of bleeding matter into an intractable lump when stored over an extended period at high temperature, for instance, in the hot season. Thus, the powder flowability of such a resin composition should preferably be stabilized over an extended period.

(3) Powder Moldability

A resin composition for powder molding sample was repeatedly subjected to slush molding. After the third molding cycle, the surface state of the obtained sheet was visually evaluated. More specifically, a nickel mold of 150 mm×100 mm×3 mm is heated to temperatures of 280° C., 260° C. and 240° C., respectively. Five hundred (500) grams of each resin composition for powder molding sample are uniformly dusted on the mold. Ten seconds later, the mold is turned upside down for removal of unmolten excessive resin composition portions. The resin composition for powder molding melt deposited onto the mold is held in that state for an additional 60 seconds, where the composition is further molten. Immediately thereafter, the mold is cooled with water. At the time the temperature of the mold lowers to 60° C., the cooled and solidified sheet is released from the mold to measure its thickness and visually check how many pinholes occur in the surface of the sheet.

The results of evaluation are given by the following symbols. It follows that materials having improved melting properties are provided by those which are molded at low temperatures to yield sheets with no thickness variation and little or no pinholes.

TABLE 2

|  | Inventive Ex. | | | Comp. Ex. | |
|---|---|---|---|---|---|
|  | 1 | 2 | 3 | 1 | 1 |
| Propylene homopolymer, ppw | 60 | 60 | 100 | 60 | 60 |
| SEBS, ppw | 40 | 40 | 0 | 40 | 40 |
| Non-halogen type thermoplastic resin 1, ppw | 1 | 5 | 20 | 0 | 50 |
| Powder flow- (23° C.) | 17.4 | 10.5 | 15.1 | 29.5 | 27.8 |
| ability (sec.) (50° C.) | 20.7 | 17.1 | 15.8 | — | 25.4 |
| Powder floability after long-term storage | 20.1 | 17.4 | 15.5 | — | 25.2 |
| Powder moldability | ○ | ○ | ○ | X | ○ |

○: No variation in sheet thickness, and little or no pinholes
Δ: Slight variation in sheet thickness, and some pinholes
X: Variations in sheet thickness, and some considerable pinholes

TABLE 3-1

|  | Inventive Ex. | | |
| --- | --- | --- | --- |
|  | 4 | 5 | 6 |
| Propylene homopolymer, ppw | 60 | 60 | 60 |
| SEBS, ppw | 40 | 40 | 40 |
| Non-halogen type thermoplastic resin 2, ppw | 5 | — | — |
| Non-halogen type thermoplastic resin 3, ppw | — | 5 | — |
| Non-halogen type thermoplastic resin 4, ppw | — | — | 5 |
| Powder flowability (sec.) (23° C.) | 16.1 | 15.8 | 15.2 |
| (50° C.) | 16.8 | 16.0 | 15.8 |
| Powder flowability after long-term storage, sec. | 16.5 | 15.5 | 15.7 |
| Powder moldability | ○ | ○ | ○ |

TABLE 3-2

|  | Comparative Examples | | | | | |
| --- | --- | --- | --- | --- | --- | --- |
|  | 3 | 4 | 5 | 6 | 7 | 8 |
| PHP, ppw | 60 | 60 | 60 | 60 | 60 | 60 |
| SEBS, ppw | 40 | 40 | 40 | 40 | 40 | 40 |
| NHTTR 5, ppw | 5 | — | — | — | — | — |
| VCR, ppw | — | 5 | — | — | — | — |
| CC, ppw | — | — | 5 | — | — | — |
| MMR, ppw | — | — | — | 5 | — | — |
| Talc, ppw | — | — | — | — | 5 | — |
| Nylon, ppw | — | — | — | — | — | 5 |
| Powder flow- (23° C.) | 19.3 | 29.5 | 17.5 | 29.1 | 16.3 | 26.3 |
| ability (sec.) (50° C.) | — | 29.8 | 17.2 | 29.5 | 16.7 | 26.8 |
| Powder flowability after long-term storage (sec.) | — | 29.7 | 17.8 | 29.3 | 16.6 | 29.5 |
| Powder moldability | Δ | Δ | X | Δ | X | Δ |

PHP: propylene homopolymer
NHTTR: non-halogen type thermoplastic resin
VCR: vinyl chloride resin
CC: calcium carbonate
MMH: methyl methacrylate homopolymer From Tables 2, 3–1 and 3–2, it is appreciated that the inventive olefin resin composition for powder molding (Examples 1–6) exhibit satisfactory powder flowability at 23° C. and 50° C. as well as satisfactory long-term storability. Powder slush molding of these resin compositions gave sheets with neither thickness variations nor pinholes. In Example 3 using only propylene homopolymer as the olefin resin (A), too, the powder flowability and long-term storability of the resin composition were satisfactory. There was also no problem in connection with powder moldability: however, the molded sheet had a hard feel.

On the other hand, when the non-halogen type thermoplastic resin (B) was not added (Comparative Example 1), the resin composition was poor in powder flowabllity, and did not fall at 50° C. due to the agglomeration of powders after long-term storage. When the amount of the non-halogen type thermoplastic resin (B) added was in excess (Comparative Example 2), the powder flowability at both 23° C. and 50° C. was less than satisfactory after short-and long-term storage.

When the non-halogen type thermoplastic resin 5 with a Tg value of 35° C. was used as the dusting agent (Comparative Example 3), the powders did not fall at 50° C. and after long-term storage.

In all the cases where the vinyl chloride resin having a relatively large particle diameter (40 μm) was used (Comparative Example 4), the methyl methacrylate homopolymer having a sphericity slightly lower than defined herein (0.7) was used (Comparative Example 6), and nylon particles were used (Comparative Example 8), no satisfactory powder flowability was obtained, and slight thickness variations were observed together with a few pinholes on the sheets prepared by powder molding. A grave disadvantage with nylon particles is that the average primary particle diameter is larger than defined herein.

In both the cases where calcium carbonate was used (Comparative Example 5) and talc was used (Comparative Example 7), powder molding gave sheets with noticeable thickness variations and pinholes.

Example 7

Following Example 2, an olefin resin composition for powder molding was prepared with the exception that 60 parts by weight of propylene homopolymer (J709 made by Grand Polymer Co., Ltd. and having an MFR of 55 g/10 min.) and 40 parts by weight of ethylene-propylene copolymer (PER M142 made by Tokuyama Co., Ltd. and an MFR of 20 g/10 min.) were used as the component (A). The obtained composition was evaluated for powder flowability, powder-flowability after long-term storability and powder mold-ability. The results are set out In Table 4.

Example 8

Example 2 was repeated with the exception that 60 parts by weight of linear low density polyethylene polymer (Novatech LLI UJ790 made by Nippon Polychem Co., Ltd. and having an MFR of 50 g/10 min.) and 40 parts by weight of hydrogenated styrene-butadiene block copolymer (Toughtech H1042 made by Asahi Chemical Industry Co., Ltd. and having an MFR of 30 g/10 min.) were used as the component (A). The results of evaluation are reported in Table 4.

Example 9

Example 2 was repeated with the exception that 60 parts by weight of propylene homopolymer (J709 made by Grand Polymer Co., Ltd. and having an MFR of 55 g/10 min.) and 40 parts by weight of ethylene-octene-1 copolymer (Engage 8400 made by Du Pont Dow Co., Ltd. and having an MFR of 30 g/10 min.) were used as the component (A). The results of evaluation are set out in Table 4.

Example 10

Example 9 was repeated with the exception that 0.5 part by weight of an organic peroxide, i.e. 2,5-dimethyl-2,5-bis (t-butylperoxy)hexane (Perhexa 25B made by Nippon Fats & Oils Co., Ltd.) was added and mixed in a tumbling mixer and the mixture was kneaded in a biaxial extruder (TEM-35B made by Toshiba Machinery Co., Ltd. with a cylinder diameter of 35 mm and a barrel temperature of 200° C.). The results of evaluation are reported in Table 4.

TABLE 4

|  | Ex. 7 | Ex. 8 | Ex. 9 | Ex. 10 |
| --- | --- | --- | --- | --- |
| Propylene Homopolymer, ppw | 60 | — | 60 | 60 |
| EPR, ppw | 40 | — | — | — |
| Straight-chain low-density polyethylene, ppw | — | 60 | — | — |
| SEBS, ppw | — | 40 | — | — |
| Ethylene-octene-1 copolymer | — | — | 40 | 40 |
| Organic peroxide, ppw | — | — | — | 0.5 |
| Non-halogen type thermoplastic resin 1, ppw | 5 | 5 | 5 | 5 |

TABLE 4-continued

|  | Ex. 7 | Ex. 8 | Ex. 9 | Ex. 10 |
|---|---|---|---|---|
| Powder flowability (sec) (23° C.) | 16.2 | 15.3 | 15.5 | 15.2 |
| (50° C.) | 16.5 | 16.7 | 15.8 | 16.2 |
| Powder flowability (sec) after long-term storage | 16.5 | 15.9 | 15.9 | 16.6 |
| Powder moldability | ○ | ○ | ○ | ○ |

From Table 4, it is understood that by combining various olefin resins (A) with the non-halogen type thermoplastic resin 1, compositions having improved powder flowability and long-term storability are obtainable and satisfactory sheets with neither thickness variations nor pinholes are obtainable by molding these compositions. From Example 10, it is noted that by the incorporation of the organic peroxide, melting properties are further so enhanced that satisfactory molding can be carried out even at a temperature lowered by 10° C.

INDUSTRIAL APPLICABILITY

The olefin resin composition for powder molding of the present invention is not only very excellent in powder flowability but can also be easily molten even under conditions where there is little or no pressure or shear stress action, and so provides excellent materials suitable for various powder-sintering processes such as powder slush molding, rotational molding, electrostatic coating, powder spray molding and fluidization dip coating. In particular, that composition is best suited for powder slush molding.

The olefin resin composition for powder molding of the present invention has improved powder flowability that can be kept intact even during long-term storage. With the olefin resin composition for powder molding of the present invention, it is possible to produce sintered products with uniform thickness and with little or no molding defects such as deficiencies or pinholes, because of its improved melting properties. Such molded products may have applications as suitable automotive skin materials for instrument panels, console boxes, armrests, door trims, etc. After the molded products are used up, they can be separately recovered and recycled on account of the absence of any halogen-containing resin.

What is claimed is:

1. An olefin resin composition for powder molding comprising 100 parts by weight of an olefin resin (A) having a glass transition temperature of up to 25° C., and 0.5 to 30 parts by weight of a non-halogen type thermoplastic resin (B) having a glass transition temperature of 60 to 200° C., an average primary particle diameter of 0.1 to 10 $\mu$m and a sphericity of 0.8 to 1.0.

2. The olefin resin composition for powder molding according to claim 1, wherein the olefin resin (A) is selected from homopolymers of an olefin monomer having 2 to 10 carbon atoms and copolymers of said olefin monomer.

3. The olefin resin composition for powder molding according to claim 1, wherein the olefin resin (A) is selected from linear low density polyethylene, ethylene-1-butene copolymer, ethylene-1-hexene copolymer, ethylene-1-heptene copolymer and ethylene-1-octene copolymer.

4. The olefin resin composition for powder molding according to claim 1, wherein the olefin resin (A) has a melt flow rate of 5 g/10 min. or greater.

5. The olefin resin composition for powder molding according to claim 1, wherein the non-halogen type thermoplastic resin (B) is a vinyl resin.

6. The olefin resin composition for powder molding according to claim 1, wherein the non-halogen type thermoplastic resin (B) is an acrylic resin.

7. The olefin resin composition for powder molding according to claim 1, which has an average particle diameter of 50 to 500 $\mu$m.

* * * * *